United States Patent
Maruyama et al.

(10) Patent No.: US 9,074,398 B2
(45) Date of Patent: Jul. 7, 2015

(54) VEHICLE DOOR STRUCTURE

(71) Applicant: KABUSHIKI KAISHA TOYOTA JIDOSHOKKI, Kariya-shi, Aichi (JP)

(72) Inventors: Katsuya Maruyama, Kariya (JP); Hiroshi Kuno, Kariya (JP); Yoshio Ojima, Kariya (JP); Taketo Fukuhara, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 13/768,237

(22) Filed: Feb. 15, 2013

(65) Prior Publication Data

US 2013/0219791 A1 Aug. 29, 2013

(30) Foreign Application Priority Data

Feb. 17, 2012 (JP) ................................ P2012-033238
Jan. 23, 2013 (JP) ................................ P2013-010240

(51) Int. Cl.
*E05F 11/00* (2006.01)
*E05D 15/48* (2006.01)
(Continued)

(52) U.S. Cl.
CPC .................. *E05D 15/48* (2013.01); *B60J 5/047* (2013.01); *B60J 5/06* (2013.01)

(58) Field of Classification Search
CPC .............. B60J 5/047; B60J 5/60; E05D 15/48
USPC ........... 49/103, 104, 109, 125, 127, 142, 143, 49/163, 164, 176, 177, 360, 254, 257, 258, 49/259; 296/155, 146.11, 146.12, 146.13; 160/211
See application file for complete search history.

(56) References Cited

U.S. PATENT DOCUMENTS 426,765 A * 4/1890 Brunhoff et al. ............... 292/166
4,502,246 A * 3/1985 Minami ........................... 49/322
(Continued)

FOREIGN PATENT DOCUMENTS

| CN | 101169026 A | 4/2008 |
|---|---|---|
| EP | 1717392 A2 | 11/2006 |

(Continued)

OTHER PUBLICATIONS

Translation of JP 57-180072; Sakurai, Masanori.*
Communication dated Oct. 27, 2014 from the Chinese Patent Office in counterpart application No. 201310051646.8.
(Continued)

*Primary Examiner* — Katherine Mitchell
*Assistant Examiner* — Abe Massad
(74) *Attorney, Agent, or Firm* — Sughrue Mion, PLLC

(57) ABSTRACT

A vehicle door structure in which it is possible to prevent a slide opening and closing door panel from being uncoupled from a swing opening and closing door panel when the swing opening and closing door panel is opened, is provided. A vehicle door structure 10 includes a lock mechanism 22 that locks a slide door panel 14 to a swing door panel 16 when the swing door panel 16 is opened. The lock mechanism 22 is composed of a locking part 50 which is provided so as to be movable backward and forward along a direction in which the slide door panel 14 and the swing door panel 16 overlap each other according to opening and closing of the swing door panel 16, and a protrusion 60 which is provided on the slide door panel 14, and is locked by the locking part 50 when the swing door panel 16 is opened. The locking part 50 moves forward to the slide door panel 14 side, to lock the protrusion 60 when the swing door panel 16 is opened.

7 Claims, 8 Drawing Sheets

(51) Int. Cl.
*B60J 5/04* (2006.01)
*B60J 5/06* (2006.01)

(56) References Cited

U.S. PATENT DOCUMENTS

| | | | |
|---|---|---|---|
| 6,170,195 B1* | 1/2001 | Lim | 49/196 |
| 7,097,229 B1* | 8/2006 | Chernoff | 296/146.1 |
| 7,451,802 B2* | 11/2008 | Cianciolo et al. | 160/211 |
| 7,699,363 B2* | 4/2010 | Langfermann et al. | 292/216 |
| 7,861,475 B2* | 1/2011 | Sprague | 52/243.1 |
| 7,950,439 B2* | 5/2011 | Anderson | 160/211 |
| 7,954,880 B2* | 6/2011 | Kunishima et al. | 296/155 |
| 2012/0167468 A1* | 7/2012 | Hozumi et al. | 49/209 |
| 2013/0227887 A1* | 9/2013 | Ojima et al. | 49/143 |

FOREIGN PATENT DOCUMENTS

| | | | |
|---|---|---|---|
| EP | 1 916 133 A1 | 4/2008 | |
| JP | 57-180072 * | 11/1982 | |
| JP | 11334377 A * | 12/1999 | B60J 5/10 |
| JP | 2000104455 A | 4/2000 | |
| JP | 2006-240611 A | 9/2006 | |
| JP | 2008-133710 A | 6/2008 | |
| JP | 2011-046271 A | 3/2011 | |
| WO | 2011/024767 A1 | 3/2011 | |

OTHER PUBLICATIONS

Extended European Search Report dated Mar. 12, 2015, issued by the European Patent Office in counterpart European application No. 13155364.6.

* cited by examiner

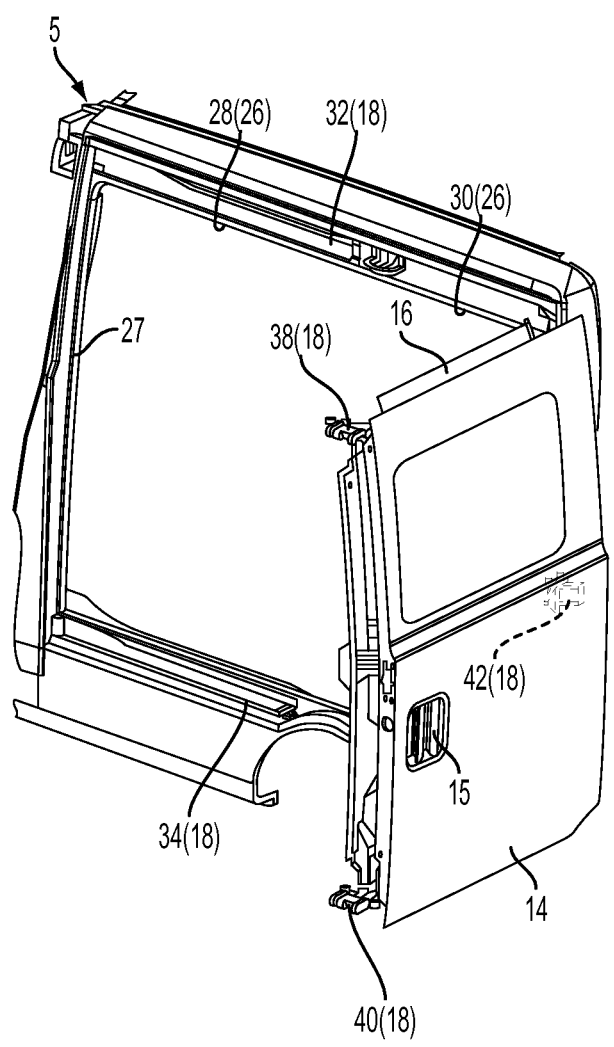

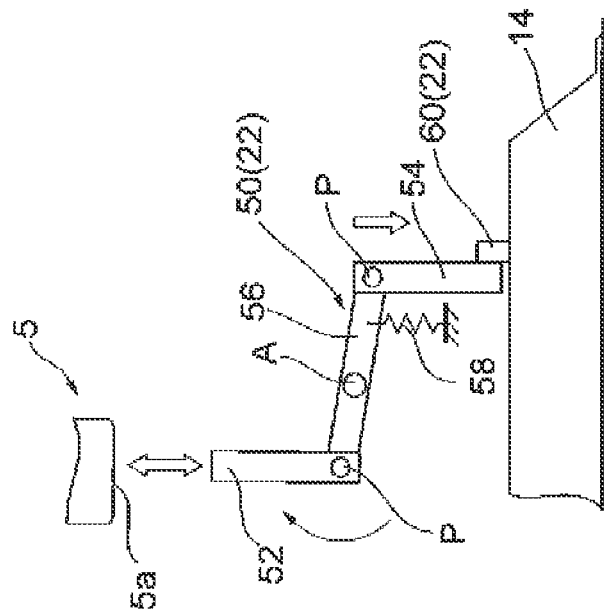
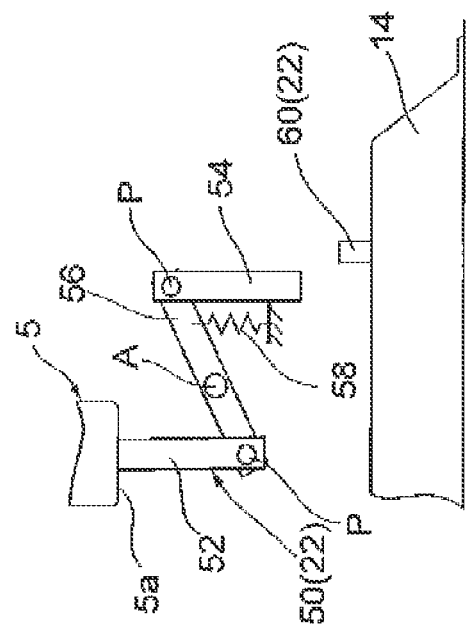

VEHICLE DOOR STRUCTURE

BACKGROUND OF THE INVENTION

1. Field of the Invention

The present invention relates to a vehicle door structure, and, in particular, to a vehicle door structure having a composite door panel in which a slide opening and closing door panel and a swing opening and closing door panel are combined.

2. Related Background Art

As a vehicle door structure, for example, the invention disclosed in Japanese Patent Application Laid-Open No. 2006-240611 has been known. The vehicle door structure disclosed in Japanese Patent Application Laid-Open No. 2006-240611 has a first door panel and a second door panel, and the first door panel is configured to be slidable with respect to the second door panel, and the second door panel is configured to be swingable with respect to the vehicle body. Further, in the above-described vehicle door structure as the conventional technology, for the reason of improving the stability of the slide opening and closing door panel at the time of slide opening and closing, it is considered that the slide opening and closing door panel is supported by the vehicle at the time of slide opening and closing of the slide opening and closing door panel, and the support of the slide opening and closing door panel by the vehicle is released when the slide opening and closing door panel is brought into a fully open condition.

As described above, in such a vehicle door structure in which a slide opening and closing door panel is supported by a vehicle at the time of opening and closing the slide opening and closing door panel, in consideration of the safety at the time of opening and closing the swing opening and closing door panel, and further, in order to reduce the load on a swinging member for swinging the swing opening and closing door panel, a state in which the slide opening and closing door panel overlaps the swing opening and closing door panel is preferably maintained at the time of opening and closing the swing opening and closing door panel. However, because a handle of the slide opening and closing door panel is made operable, when the handle of the slide opening and closing door panel is accidentally operated in a state in which the swing opening and closing door panel is open, the fixation of the slide opening and closing door panel and the swing opening and closing door panel is released. Thus, there is a risk that the slide opening and closing door panel is not supported by the vehicle, and the slide opening and closing door panel may be uncoupled from the swing opening and closing door panel.

An object of the invention is to provide a vehicle door structure in which it is possible to prevent the slide opening and closing door panel from being uncoupled from the swing opening and closing door panel when the swing opening and closing door panel is opened.

SUMMARY OF THE INVENTION

In accordance with an aspect of the present invention, a vehicle door structure includes a first door panel which is installed at a first opening section provided in a vehicle body, the first door panel opens and closes the first opening section, a second door panel which is installed at a second opening section continuously provided adjacent to the first opening section, the second door panel opens and closes the second opening section, a sliding mechanism with which the first door panel is slidably mounted with respect to the vehicle body, and the first door panel is moved between a closed position at which the first opening section is closed and an open position at which the first door panel overlaps the second door panel at the same time as the first opening section is fully opened, and a swinging mechanism with which the second door panel is swingably supported with respect to the vehicle body, and makes the second door panel swingable when the first door panel is at the open position, and the vehicle door structure further includes a locking mechanism with which the first door panel is locked to the second door panel when the second door panel is opened, in which the locking mechanism is composed of a locking part which is provided on one of the first door panel and the second door panel, and is provided so as to be movable backward and forward along a direction in which the first door panel and the second door panel overlap each other according to opening and closing of the second door panel, and a part to be locked which is provided on the other one of the first door panel and the second door panel, and to be locked by the locking part when the second door panel is opened, and the locking part moves forward to the part to be locked side in order to lock the part to be locked when the second door panel is opened.

The vehicle door structure includes the locking mechanism with which the first door panel is locked to the second door panel when the second door panel is opened, and the locking mechanism is composed of the locking part which is provided so as to be movable backward and forward along the direction in which the first door panel and the second door panel overlap each other according to opening and closing of the second door panel, and moves forward when the second door panel is opened, and the part to be locked. With this configuration, in the vehicle door structure, the locking part moves forward to the part to be locked side, and the locking part locks the part to be locked in a state in which the second door panel is open. Accordingly, in the vehicle door structure, because the first door panel is restricted in movement in the open state of the second door panel, it is possible to prevent the slide opening and closing first door panel from being uncoupled from the swing opening and closing second door panel.

In accordance with another aspect, the locking part may be provided on the second door panel, and may have a contacting member which comes into contact with the vehicle body at a closed position of the second door panel that closes the second opening section by the second door panel, a locking member which reciprocates between a forward-moving position for forward movement to the first door panel side and a backward-moving position for backward movement to the second door panel side, a coupling member which couples the contacting member and the locking member, and a biasing member which biases the locking member in a direction in which the locking member moves forward, and the locking member may move forward to the first door panel side when the contacting member is spaced from the vehicle body. With this configuration, in the vehicle door structure, the locking member automatically moves forward to the first door panel side by bias from the biasing member when the second door panel is opened. Accordingly, in the vehicle door structure, when the second door panel is opened, it is possible to lock the part to be locked in good condition with the locking member.

In accordance with another aspect, the sliding mechanism may be composed of a slide rail provided on the second door panel, and a slide part which is provided on the first door panel, the slide part slides in the slide rail, and the part to be locked may be provided on the slide part, and the locking part may move into the slide rail when the second door panel is opened. With this configuration, in the vehicle door structure, it is possible to obscure a hole into which the locking part moves, in the second door panel. Further, in the vehicle door structure, because the position at which the locking part and the part to be locked are locked is close to the second door panel, it is possible to reduce the load on the locking part, and to prevent an increase in weight due to securement of strength of the locking part.

In accordance with another aspect, the locking part may be a protrusion protruding toward the second door panel side at the open position of the first door panel. With this configuration, in the vehicle door structure, it is possible to lock the part to be locked in good condition with the locking part.

In accordance with another aspect, the part to be locked may be a concave portion through which the locking member is inserted. With this configuration, in the vehicle door structure, it is possible to lock the part to be locked in good condition with the locking member (locking part).

In accordance with another aspect, the sliding mechanism may be composed of a slide rail provided on the second door panel, and a slide part which is provided on the first door panel, the slide part slides in the slide rail, and the part to be locked may be provided on the slide rail, and the locking part may be provided on the slide part, and may move into the part to be locked when the second door panel is opened.

In accordance with the present invention, when the swing opening and closing door is opened, it is possible to prevent the slide opening and closing door from being uncoupled from the swing opening and closing door.

BRIEF DESCRIPTION OF THE DRAWINGS

FIG. 3 is a perspective view showing a state in which a swing door panel is open in the vehicle door structure.

FIGS. 7A and 7B are diagrams for explanation of the operation of the lock mechanism.

DESCRIPTION OF THE PREFERRED EMBODIMENTS

Figure 1:
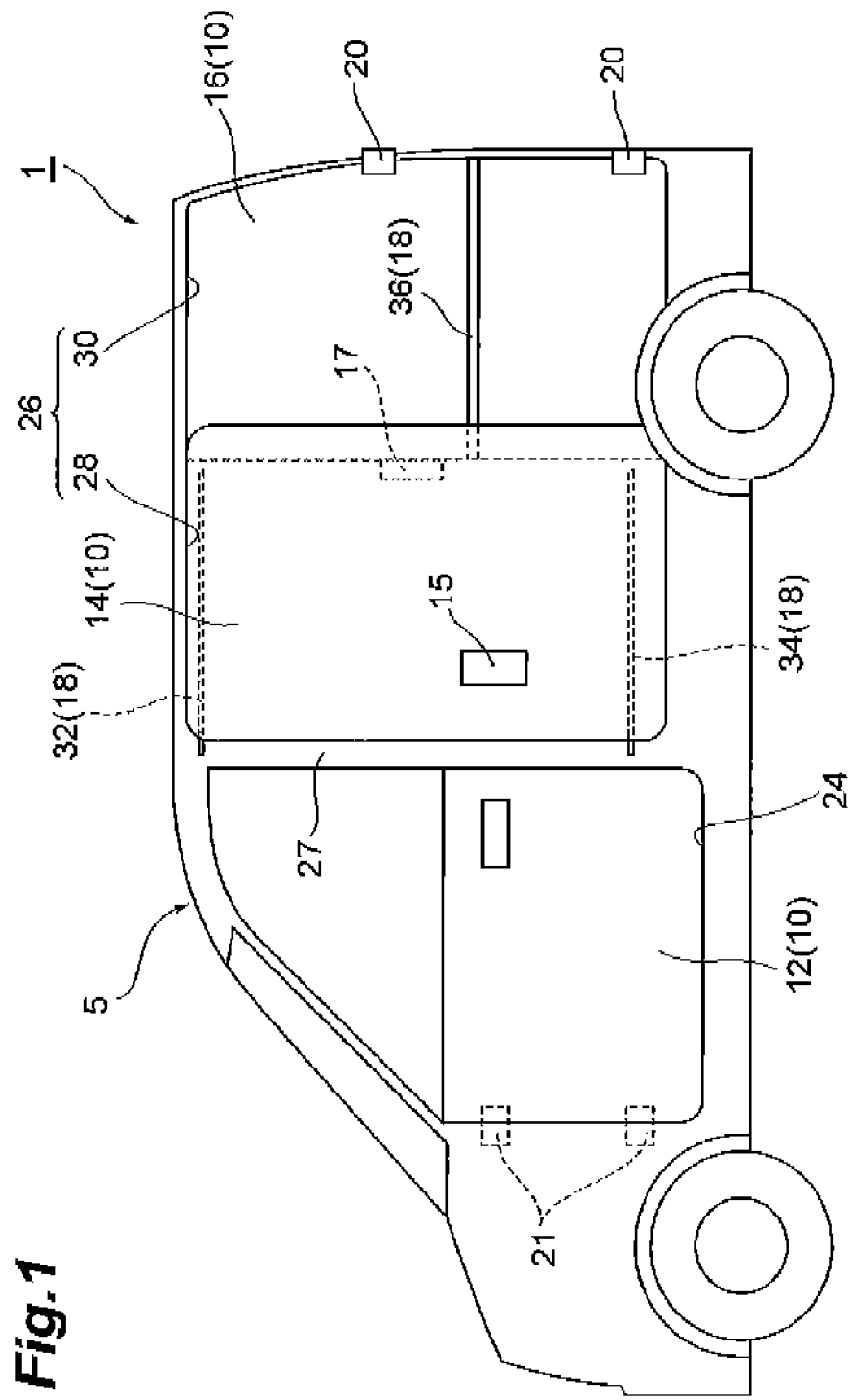
FIG. 1 is a side view showing a vehicle body to which a vehicle door structure according to an embodiment is applied.

Hereinafter, preferred embodiments of the present invention will be described in detail with reference to the accompanying drawings. In addition, the same or corresponding components are denoted by the same reference numerals in the description of the drawings, and overlapping descriptions will be omitted.

FIG. 1 is a side view showing a vehicle body to which a vehicular door panel according to an embodiment is applied. In addition, in the following descriptions, the words "front," "rear," "upper," "lower," and the like may be used in some case. These words correspond to the front and rear/upper and lower portions of a vehicle (automobile).

A vehicle 1 shown in FIG. 1 is, for example, a minivan to which a vehicle door structure 10 according to the embodiment is applied. In the following description, an example in which the vehicle door structure 10 is applied to one side surface (left side surface) of the vehicle 1 shown in FIG. 1 will be described. A similar configuration may be provided on the other side surface.

Figure 2A:
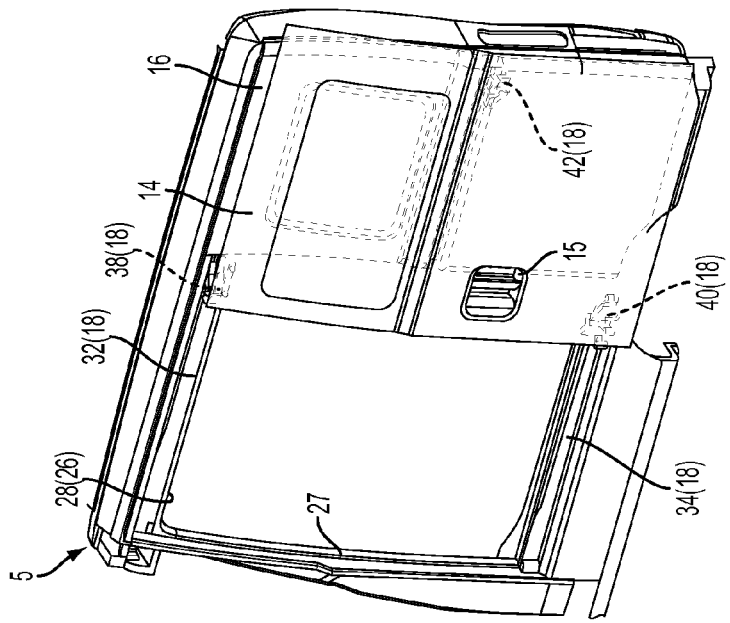
FIG. 2A is a perspective view showing a state in which a slide door panel is in the process of being opened.
Figure 2B:
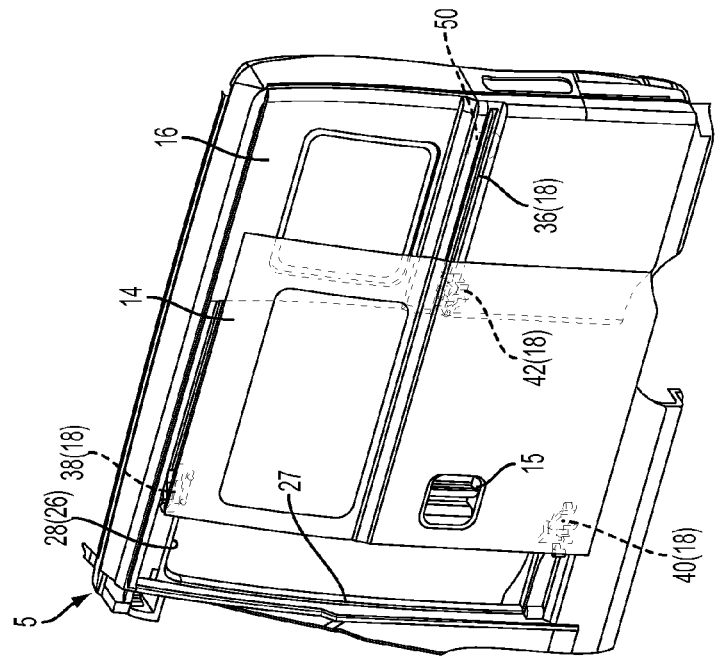
FIG. 2B is a perspective view showing a state in which the slide door panel is at an open position.
Figure 4:
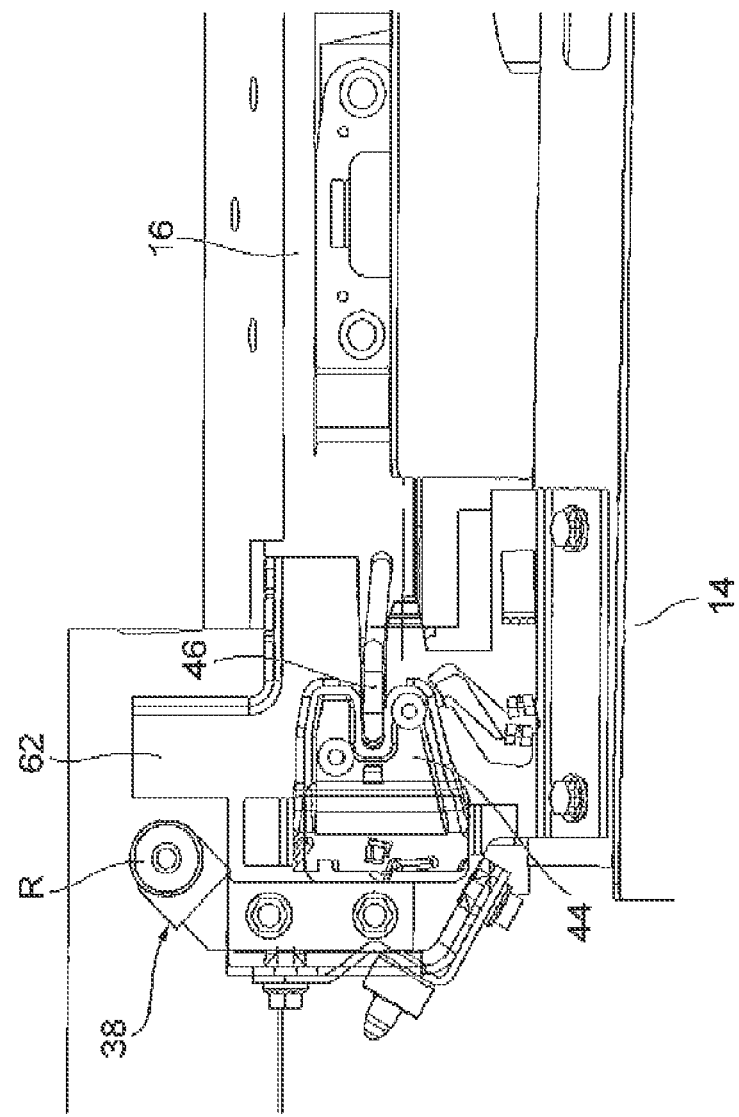
FIG. 4 is an overhead view of a state in which the slide door panel and the swing door panel are fixed.

FIG. 2A is a perspective view showing a state in which a slide door panel is in the process of being opened, and FIG. 2B is a perspective view showing a state in which the slide door panel is at an open position. FIG. 3 is a perspective view showing a state in which a swing door panel is open in the vehicle door structure. FIG. 4 is an overhead view of a state in which the slide door panel and the swing door panel are fixed.

Figure 5:
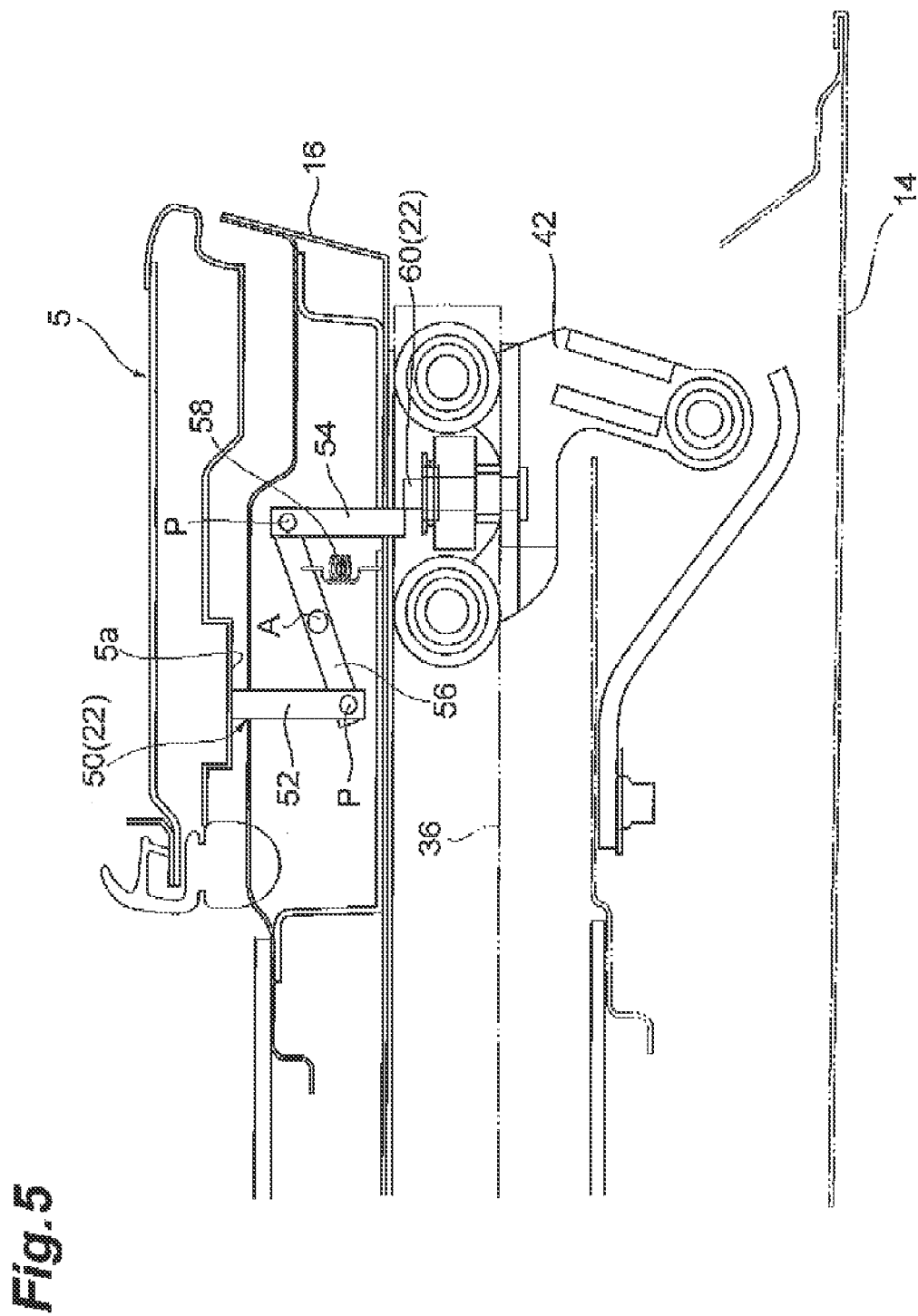
FIG. 5 is a diagram showing a lock mechanism.
Figure 6:
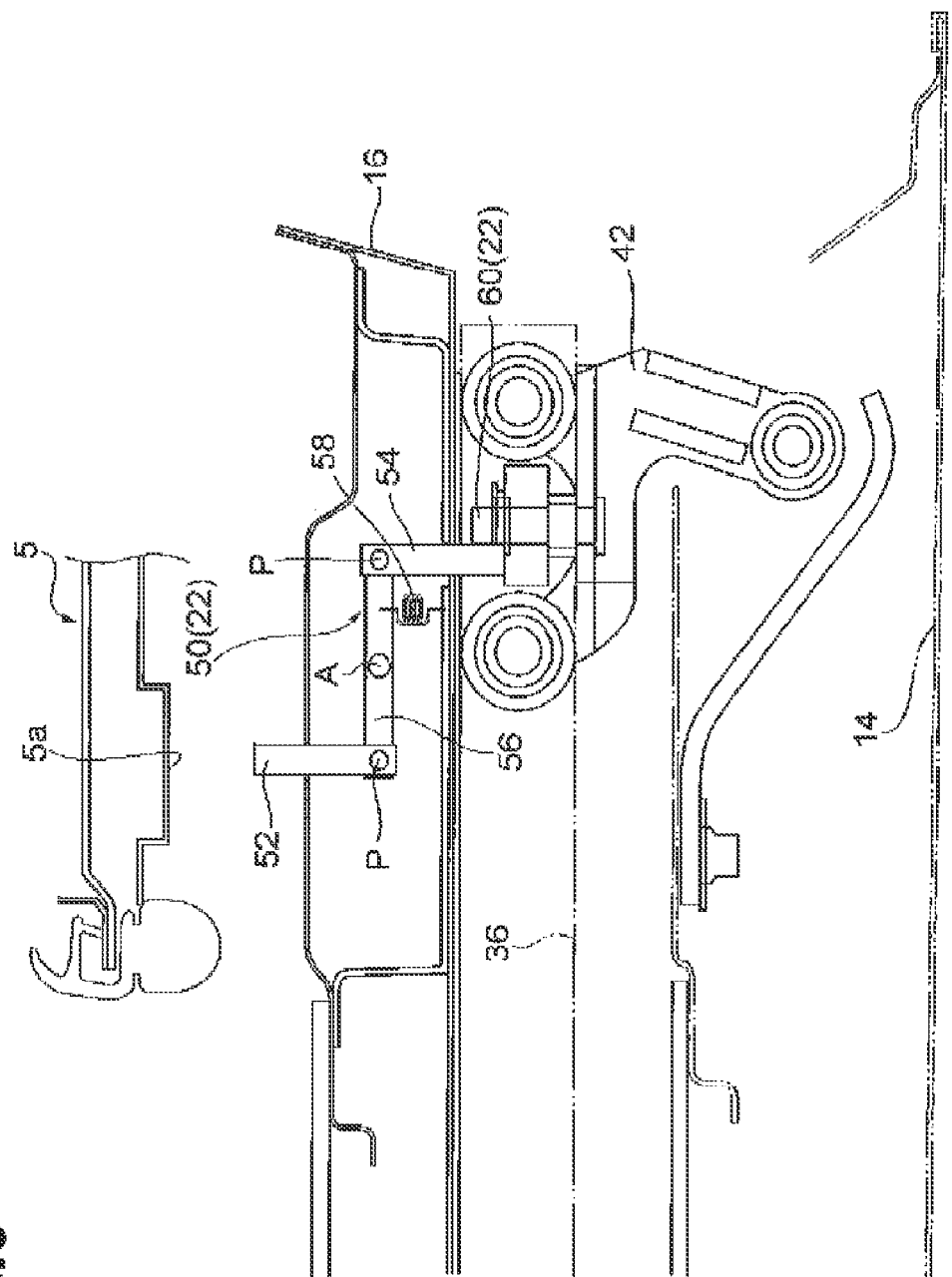
FIG. 6 is a diagram showing the lock mechanism.

As shown in the respective diagrams, the vehicle door structure 10 includes a front door panel 12, a slide door panel (first door panel) 14, a swing door panel (second door panel) 16, a slide mechanism (sliding mechanism) 18, hinge mechanisms (swinging mechanism) 20 and a lock mechanism (locking mechanism) 22 (refer to FIGS. 5 and 6).

First, a front opening section 24 to which the front door panel 12 is installed and a rear opening section 26 to which the slide door panel 14 and the swing door panel 16 are installed will be described.

The front opening section 24 and the rear opening section 26 are provided in one side surface of a vehicle body 5. The front opening section 24 is provided in the front of the vehicle body 5, and is a portion through which someone gets in or gets out of a driver seat or a passenger seat. The front door panel 12 is a door panel for opening and closing the front opening section 24, and is provided so as to be swingable with respect to the vehicle body 5 by the hinge mechanisms 21.

The rear opening section 26 is provided in the rear of the vehicle body 5, and is a portion through which someone gets in and/or gets out of the rear seats, or puts in and/or takes out baggage. The rear opening section 26 is partitioned from the front opening section 24 with a pillar 27. The rear opening section 26 is composed of a first opening section 28 and a second opening section 30. The first opening section 28 and the second opening section 30 are continuously provided adjacent to each other in the front-back direction. The first opening section 28 is provided on the front side of the vehicle body 5 in the rear opening section 26, and the second opening section 30 is provided on the rear side of the vehicle body 5 in the rear opening section 26.

The slide door panel 14 is installed at the first opening section 28. The slide door panel 14 is a door panel for opening and closing the first opening section 28. The slide door panel 14 is provided so as to be slidable in the front-back direction with respect to the vehicle body 5 and the swing door panel 16 by the slide mechanism 18. A handle 15 is provided on the slide door panel 14, and the slide door panel 14 is opened and closed by operating the handle 15.

The swing door panel 16 is installed at the second opening section 30. The swing door panel 16 is a door panel for opening and closing the second opening section 30. The swing door panel 16 is provided so as to be swingable with respect to the vehicle body 5 by the hinge mechanisms 20. A handle 17 is provided on the swing door panel 16, and the swing door panel 16 is opened and closed by operating the handle 17. The entire rear opening section 26 is opened and closed with the slide door panel 14 and the swing door panel 16.

The slide mechanism 18 is mounted to make the slide door panel 14 slidable with respect to the vehicle body 5. The slide mechanism 18 is a mechanism which moves the slide door panel 14 between a closed position at which the slide door panel 14 closes the first opening section 28 and an open position at which the slide door panel 14 overlaps the swing door panel 16 at the same time as the first opening section 28 is fully opened. The slide mechanism 18 includes an upper slide rail 32, a lower slide rail 34, an intermediate slide rail 36, an upper slide part 38, a lower slide part 40 and an intermediate slide part 42.

The upper slide rail 32 is disposed at the upper portion (a roof side rail) of the vehicle body 5 in the first opening section 28. The upper slide rail 32 is extended along the front-back direction of the vehicle body 5. The lower slide rail 34 is disposed at the lower portion (on the floor side) of the vehicle body 5 in the first opening section 28. The lower slide rail 34 is extended along the front-back direction of the vehicle body 5.

The intermediate slide rail 36 is disposed on the exterior surface side in the swing door panel 16. The intermediate slide rail 36 is disposed substantially at the central portion in the height direction of the vehicle body 5 in the swing door panel 16. The intermediate slide rail 36 is extended along the front-back direction of the vehicle body 5.

The upper slide part 38, the lower slide part 40 and the intermediate slide part 42 are provided on the slide door panel 14. As shown in FIG. 2, the upper slide part 38 is disposed at the upper portion on the front end side of the slide door panel 14. The lower slide part 40 is disposed at the lower portion on the front end side of the slide door panel 14. The intermediate slide part 42 is disposed on the rear end side and substantially at the central portion in the height direction of the slide door panel 14.

The upper slide part 38 includes a roller R. The lower slide part 40 and the intermediate slide part 42 include unillustrated rollers. The rollers are guided by the upper slide rail 32, the lower slide rail 34 and the intermediate slide rail 36 to slide, thereby making the slide door panel 14 slidable with respect to the vehicle body 5 and the swing door panel 16.

The slide door panel 14 is made freely movable in the front-back direction of the vehicle body 5 between the closed position at which the first opening section 28 is closed and the open position (FIG. 2B) at which the slide door panel 14 is located lateral to the swing door panel 16 to overlap the swing door panel 16 at the same time as the first opening section 28 is fully opened.

Specifically, when the slide door panel 14 is at the closed position, the upper, lower and intermediate slide parts 38, 40 and 42 are guided by the upper, lower and intermediate slide rails 32, 34 and 36. Further, when the slide door panel 14 is at the open position, the upper and lower slide parts 38 and 40 are detached from the upper and lower slide rails 32 and 34 (refer to FIG. 3), and only the intermediate slide part 42 is guided by the intermediate slide rail 36.

The hinge mechanisms 20 are provided on the rear side in the second opening section 30 (the rear opening section 26). A pair of the hinge mechanisms 20 are disposed so as to have a space in the vertical direction of the vehicle body 5. The swing door panel 16 is supported so as to be swingable with respect to the vehicle body 5 by the hinge mechanisms 20, and as shown in FIG. 3, the swing door panel 16 swings to be opened and closed centering on the shaft along the vertical direction of the vehicle body 5.

The slide door panel 14 is fixed to the swing door panel 16 at the open position. As shown in FIG. 4, a latch 44 is provided on a base 62 mounted to the slide door panel 14. A door panel lock striker 46 is provided on the swing door panel 16. The latch 44 of the slide door panel 14 is coupled to the door panel lock striker 46 of the swing door panel 16 when the slide door panel 14 gets to the open position (the position at which the rollers of the upper and lower slide parts 38 and 40 are detached from the upper and lower slide rails 32 and 34). Thereby, fixing the slide door panel 14 and the swing door panel 16.

Here, it is possible to release the coupling of the latch 44 of the slide door panel 14 and the door panel lock striker 46 of the swing door panel 16 by operating the handle 15 of the slide door panel 14. Therefore, even in a state in which the slide door panel 14 and the swing door panel 16 are fixed when the swing door panel 16 is opened, in the case where the handle 15 of the slide door panel 14 is accidentally operated, the fixation of the latch 44 and the door panel lock striker 46 is released, thereby making the slide door panel 14 slidable. At this time, the slide door panel 14 is slid to the front side of the vehicle body 5 with respect to the swing door panel 16, the intermediate slide part 42 may be detached from the intermediate slide rail 36, and the slide door panel 14 may be uncoupled from the swing door panel 16.

Then, the vehicle door structure 10 according to the present embodiment includes the lock mechanism 22. The lock mechanism 22 is provided separately from the latch 44 and the door panel lock striker 46 described above, and is a mechanism for locking the slide door panel 14 to the swing door panel 16 when the swing door panel 16 is opened.

FIGS. 5 and 6 are diagrams showing the lock mechanism, and overhead views of the lock mechanism. As shown in FIGS. 5 and 6, the lock mechanism 22 includes a locking part 50 provided on the swing door panel 16 and a protrusion (a part to be locked) 60 provided on the slide door panel 14. The locking part 50 is provided on the rear end side at a height position of the intermediate slide rail 36 disposed at the swing door panel 16 (refer to FIG. 2). The locking part 50 includes a sensing member (a contacting member) 52, a backward and forward moving member (a locking member) 54, a coupling member 56, and a spring (a biasing member) 58.

The sensing member 52 is a portion which contacts a body surface 5a (pillar) of the vehicle body 5 in the closed state of the swing door panel 16. The sensing member 52 is a substantially columnar member disposed so as to extend along the direction in which the slide door panel 14 and the swing door panel 16 overlap each other (the width direction of the vehicle body 5). The sensing member 52 is disposed at a position at which its leading end contacts the body surface 5a of the vehicle body 5 in a state in which the swing door panel 16 is closed. That is, the sensing member 52 is spaced from the body surface 5a of the vehicle body 5 when the swing door panel 16 is opened.

The backward and forward moving member 54 is a portion for locking the protrusion 60. The backward and forward moving member 54 is a substantially columnar member, which is disposed so as to extend along the direction in which the slide door panel 14 and the swing door panel 16 overlap each other. That is, the backward and forward moving member 54 and the sensing member 52 are installed substantially parallel. The backward and forward moving member 54 is disposed so as to be movable backward and forward along the direction in which the slide door panel 14 and the swing door panel 16 overlap each other, from the swing door panel 16 toward the inside of the intermediate slide rail 36 according to opening and closing of the swing door panel 16. That is, the backward and forward moving member 54 reciprocates between the forward-moving position for forward movement to the slide door panel 14 side toward the inside of the intermediate slide rail 36 and a backward-moving position for backward movement to the swing door panel 16 side.

The leading end of the backward and forward moving member 54 moves backward to be located on the swing door panel 16 side at the closed position of the swing door panel 16 (FIG. 5: Backward-moving position). Further, the backward and forward moving member 54 protrudes outside the surface of the swing door panel 16 at the open position of the swing door panel 16, and moves forward from the swing door panel 16 side to the slide door panel 14 side (FIG. 6: Forward-moving position).

The coupling member 56 is a portion for coupling the sensing member 52 and the backward and forward moving member 54. The coupling member 56 is a substantially columnar member, and is provided so as to be turnable centering on its central portion as a shaft axis. Specifically, the coupling member 56 is supported pivotally by a shaft A along the vertical direction of the vehicle body 5. With this, the coupling member 56 is provided so as to be freely turnable along the horizontal plane.

One end of the coupling member 56 and one end of the sensing member 52 are coupled so as to be each turnable with, for example, a coupling pin P. The other end of the coupling member 56 and one end of the backward and forward moving member 54 are coupled so as to be each turnable with, for example, the coupling pin P. The sensing member 52, the backward and forward moving member 54, and the coupling member 56 are integrally provided, and located in the same plane. With this, the backward and forward moving member 54 operates in synchronization with the operation of the sensing member 52. That is, the backward and forward moving member 54 and the sensing member 52 interlock with one another.

The spring 58 is a member for biasing the backward and forward moving member 54 in the direction in which the backward and forward moving member 54 moves forward. The spring 58 is, for example, a coil spring, and is disposed so as to be stretchable along the direction in which the slide door panel 14 and the swing door panel 16 overlap each other. Specifically, one end of the spring 58 is connected to a place on the side close to the coupling portion with the backward and forward moving member 54 in the coupling member 56, and the other end of the spring 58 is connected to the swing door panel 16. The spring 58 is in a stretched state in the initial state, i.e., at the closed position of the swing door panel 16. With this, the spring 58 applies the force of turning clockwise to the coupling member 56, and biases the backward and forward moving member 54 in the direction of moving forward to the swing door panel 16.

In the locking part 50, as shown in FIG. 6, when the sensing member 52 is spaced from the body surface 5a of the vehicle body 5, the coupling member 56 turns clockwise by the spring 58. Thereby, automatically moving the backward and forward moving member 54 located on the swing door panel 16 side forward to the slide door panel 14 side.

The protrusion 60 is a portion locked by the locking part 50 at the opened position of the slide door panel 14. The protrusion 60 is disposed at the intermediate slide part 42 as shown in FIGS. 5 and 6. Specifically, the protrusion 60 is provided so as to protrude toward the swing door panel 16 side in the slide door panel 14. The protrusion 60 is provided so as to be located on the rear side of the vehicle body 5 more than the backward and forward moving member 54 when the backward and forward moving member 54 moves forward from the swing door panel 16.

Next, the operation of the lock mechanism 22 will be described. FIGS. 7A and 7B are diagrams for explanation of the operation of the lock mechanism. As shown in FIG. 7A, in a state in which the slide door panel 14 is at the open position, and the swing door panel 16 is closed, the sensing member 52 contacts the body surface 5a of the vehicle body 5.

When the swing door panel 16 is opened from this state, the sensing member 52 is, as shown in FIG. 7B, spaced from the body surface 5a of the vehicle body 5. At this time, the backward and forward moving member 54 interlocking with the sensing member 52 automatically moves forward to the slide door panel 14 side by bias of the spring 58. Then, the backward and forward moving member 54 locks the protrusion 60 of the slide door panel 14. In this way, when the protrusion 60 is locked by the backward and forward moving member 54, the swing door panel 16 is restricted in movement to the front side of the vehicle body 5.

Further, when the swing door panel 16 is closed, the sensing member 52 of the protrusion 50 comes into contact with the body surface 5a of the vehicle body 5. The backward and forward moving member 54 moves backward to the swing door panel 16 side so as to interlock with this action. Thereby, releasing the locking of the protrusion 60 of the slide door panel 14 by the locking part 50 of the swing door panel 16 in the lock mechanism 22.

As described above, the vehicle door structure 10 according to the present embodiment includes the lock mechanism 22. The lock mechanism 22 includes the locking part 50 provided on the swing door panel 16 and the protrusion 60 provided on the slide door panel 14. The locking part 50 has the backward and forward moving member 54 which moves forward to the slide door panel 14 side so as to interlock with this action when the sensing member 52 is spaced from the body surface 5a of the vehicle body 5.

With this configuration, in the vehicle door structure 10, when the swing door panel 16 is opened, the backward and forward moving member 54 of the locking part 50 provided on the swing door panel 16 automatically protrudes toward the slide door panel 14 side. At this time, the backward and forward moving member 54 locks the protrusion 60 of the slide door panel 14. With this, in the vehicle door structure 10, the slide door panel 14 is restricted in movement when the swing door panel 16 is opened. Accordingly, in the vehicle door structure 10, it is possible to prevent the slide door panel 14 from being decoupled from the swing door panel 16 when the swing door panel 16 is opened. As a result, it is possible to ensure safety of the vehicle door structure 10.

The present invention is not limited to the above-described embodiment. For example, in the present embodiment, as a part to be locked, the protrusion 60 protruding toward the swing door panel 16 side has been described as an example. However, the part to be locked may be a concave portion or a hole through which the backward and forward moving member 54 is inserted.

Further, in the above-described embodiment, in the locking part 50, the sensing member 52 is disposed on the front side of the vehicle body, and the backward and forward moving member 54 is disposed on the rear side of the vehicle with respect to the shaft A. However, the layouts of the sensing member 52 and the backward and forward moving member 54 are not limited thereto. For example, the sensing member 52 may be disposed on the rear side of the vehicle, and the backward and forward moving member 54 may be disposed on the front side of the vehicle, or the sensing member 52 and the backward and forward moving member 54 may be disposed one above the other. However, as the sensing member 52 is disposed on the further front side of the vehicle of the swing door panel 16, it is possible to improve the sensitivity of moving the backward and forward moving member 54 forward, to the aperture of the swing door panel 16.

Figure 8:
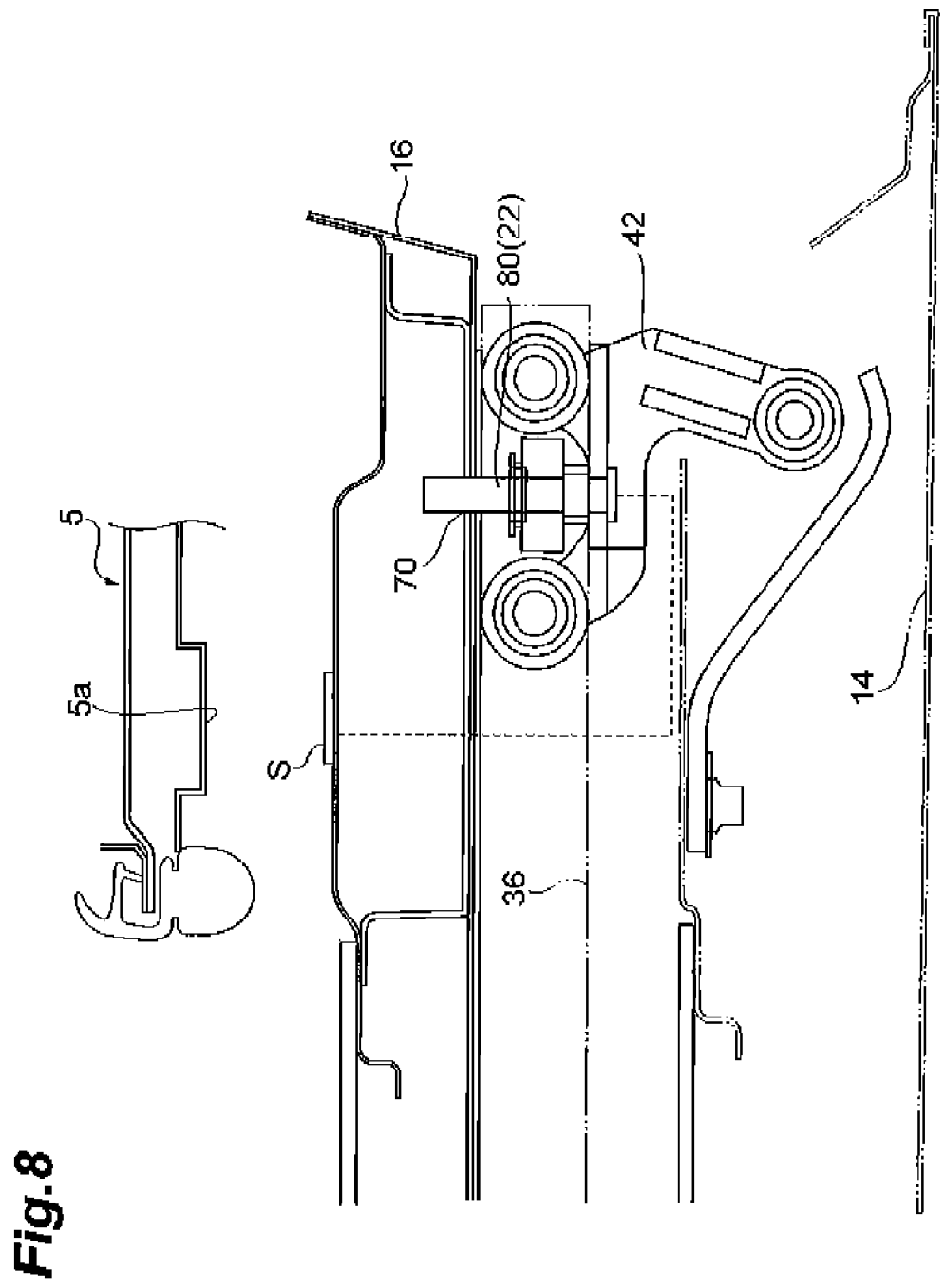
FIG. 8 is a diagram showing a lock mechanism of another embodiment.

Further, in the above-described embodiment, the locking part is disposed to the swing door panel 16, and the part to be locked is disposed to the slide door panel 14. However, the layouts of the locking part and the part to be locked are not limited thereto. For example, as shown in FIG. 8, a sensing member S composed of a sensor may be disposed so as to contact or be close to the body surface 5a of the vehicle body 5, and a protrusion (locking part) 80 which is movable backward and forward may be disposed to the intermediate slide part 42, and a part to be locked 70 may be disposed at a position corresponding to the protrusions 80 of the intermediate slide rail 36 and the swing door panel 42. In this case, the sensing member S generates a signal when it is sensed that the swing door panel 16 is spaced from the body surface 5a of the vehicle body 5, and with this, the protrusion 80 moves forward to the intermediate slide rail 36 and the swing door panel 16, to get into the part to be locked 70. With this, in the vehicle door structure, it is possible to prevent the slide door panel 14 from being decoupled from the swing door panel 16 when the swing door panel 16 is opened.

What is claimed is:

1. A vehicle door structure comprising:
   a first door panel which is installed at a first opening section provided in a vehicle body, the first door panel opens and closes the first opening section;
   a second door panel which is installed at a second opening section continuously provided adjacent to the first opening section, the second door panel opens and closes the second opening section;
   a sliding mechanism with which the first door panel is slidably mounted with respect to the vehicle body and the second door panel, and the first door panel is moved between a closed position at which the first opening section is closed and an open position at which the first door panel overlaps the second door panel at the same time as the first opening section is fully opened; and
   a swinging mechanism with which the second door panel is swingably supported with respect to the vehicle body, and the second door panel is made swingable when the first door panel is at the open position,
   the vehicle door structure further includes a locking mechanism with which the first door panel is locked to the second door panel when the second door panel is opened, wherein
   the locking mechanism is composed of a locking part which is provided on one of the first door panel and the second door panel, and is provided so as to be movable backward and forward along a direction in which the first door panel and the second door panel overlap each other according to opening and closing of the second door panel, and a part to be locked which is provided on the other one of the first door panel and the second door panel, to be locked by the locking part when the second door panel is opened,
   the locking part moves toward the part to be locked, to lock the part to be locked when the second door panel is opened,
   the sliding mechanism is composed of an upper slide rail, a lower slide rail, and an intermediate slide rail provided on the second door panel, the intermediate slide rail provided between the upper slide rail and lower slide rail, and an upper slide part, a lower slide part, and an intermediate slide part which are provided on the first door panel, the upper slide part, the lower slide part, and the intermediate slide part slide in the upper slide rail, the lower slide rail, and the intermediate slide rail, respectively,
   and the part to be locked is
   provided on the intermediate slide part, the locking part includes a contacting member, a locking member, and a coupling member, wherein a first end of the contacting member is pivotally coupled to a first end of the coupling member, a first end of the locking member is pivotally coupled to a second end of the coupling member, and a second end of the locking member is configured to contact the part to be locked and
   the locking member moves into the intermediate slide rail when the second door panel is opened.

2. The vehicle door structure according to claim 1, wherein the locking part is provided on the second door panel, and has the contacting member which comes into contact with the vehicle body at a closed position of the second door panel that closes the second opening section, the locking member which reciprocates between a forward-moving position for forward movement to a first door panel side and a backward-moving position for backward movement to a second door panel side, the coupling member which couples the contacting member and the locking member, and a biasing member which biases the locking member in a direction in which the locking member moves forward, and
   the locking member moves forward to the first door panel side when the contacting member is spaced from the vehicle body.

3. The vehicle door structure according to claim 1, wherein the part to be locked is a protrusion protruding toward a second door panel side at the open position of the first door panel.

4. The vehicle door structure according to claim 2, wherein the part to be locked is a concave portion through which the locking member is inserted.

5. The vehicle door structure according to claim 1, wherein the part to be locked is locked by the locking mechanism only when the second door panel is open.

6. The vehicle door structure according to claim 1, wherein the contacting member and the locking member are configured to be movable forward and backward along a direction essentially perpendicular to the direction of sliding of the first door panel.

7. The vehicle door structure according to claim 1, wherein the slide part extends from the first door in a direction perpendicular to the first door panel and the second door panel.

* * * * *